(12) United States Patent
Yasunaga

(10) Patent No.: US 11,021,020 B2
(45) Date of Patent: Jun. 1, 2021

(54) METHOD FOR ARRANGING STUD PINS IN PNEUMATIC TIRE

(71) Applicant: TOYO TIRE & RUBBER CO., LTD., Itami (JP)

(72) Inventor: Toshikazu Yasunaga, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 215 days.

(21) Appl. No.: 16/167,798

(22) Filed: Oct. 23, 2018

(65) Prior Publication Data
US 2019/0135046 A1 May 9, 2019

(30) Foreign Application Priority Data

Nov. 8, 2017 (JP) .............................. JP2017-215873

(51) Int. Cl.
| | | |
|---|---|---|
| *B60C 11/16* | (2006.01) | |
| *B29D 30/66* | (2006.01) | |
| *B60C 11/03* | (2006.01) | |

(52) U.S. Cl.
CPC .......... *B60C 11/1625* (2013.01); *B29D 30/66* (2013.01); *B60C 11/0302* (2013.01); *B60C 11/1637* (2013.01); *B29D 2030/662* (2013.01); *B60C 11/1675* (2013.01); *B60C 2011/0374* (2013.01)

(58) Field of Classification Search
CPC .................................................. B60C 11/1625
See application file for complete search history.

(56) References Cited

U.S. PATENT DOCUMENTS

| | | | | |
|---|---|---|---|---|
| 2002/0050312 | A1* | 5/2002 | Ostrovskis | .......... B60C 11/1643 |
| | | | | 152/208 |
| 2014/0290819 | A1 | 10/2014 | Kuwayama et al. | |
| 2017/0368889 | A1* | 12/2017 | Ajoviita | .............. B60C 11/1625 |

FOREIGN PATENT DOCUMENTS

| | | | |
|---|---|---|---|
| CN | 103987532 A | 8/2014 | |
| DE | 1 850 309 U | 4/1962 | |
| DE | 10 2009 044 767 A1 | 6/2011 | |
| EP | 2979902 A2 * | 2/2016 | ......... B60C 11/1625 |

(Continued)

OTHER PUBLICATIONS

ESpaceNet Translation of JPWO2014091790A1 (Year: 2020).*

(Continued)

*Primary Examiner* — Robert C Dye
*Assistant Examiner* — Alexander D Booth
(74) *Attorney, Agent, or Firm* — Westerman, Hattori, Daniels & Adrian, LLP

(57) ABSTRACT

A method for arranging stud pins in a pneumatic tire is a method for arranging stud pins in a tread portion at intervals in a tire width direction so as to form a plurality of rows. This method includes specifying an inner region, an intermediate region, and an outer region by virtually partitioning the tread portion into equal three parts from a center line extending in a tire circumferential direction to a ground contact end in the tire width direction outward. The method also includes arranging the stud pins such that among numbers of stud pins per row in the inner region, the intermediate region, and the outer region, the number in the outer region is the largest, the number in the intermediate region is the second largest, the number in intermediate region is the smallest.

9 Claims, 4 Drawing Sheets

(56) References Cited

FOREIGN PATENT DOCUMENTS

| | | | |
|---|---|---|---|
| EP | 3 330 105 A1 | 6/2018 | |
| GB | 1480929 A * | 7/1977 | ......... B60C 11/1625 |
| JP | 2007112218 A * | 5/2007 | |
| JP | 2009023604 A | 2/2009 | |
| WO | 2011/067006 A1 | 6/2011 | |
| WO | WO2014091790 A1 * | 6/2014 | ......... B60C 11/1625 |
| WO | 2017/022683 A1 | 2/2017 | |

OTHER PUBLICATIONS

Office Action dated May 29, 2019, issued in counterpart DE Application No. 10 2018 126 619.7, with English translation (10 pages).

Office Action dated Jul. 27, 2020, issued in counterpart CN Application No. 201811226728.0, with English translation (14 pages).

Office Action dated Mar. 19, 2021, issued in counterpart CN Application No. 201811226728.0, with English translation (9 pages).

* cited by examiner

METHOD FOR ARRANGING STUD PINS IN PNEUMATIC TIRE

CROSS-REFERENCE TO RELATED APPLICATIONS

This application claims priority of Japanese Patent Application No. 2017-215873 filed on Nov. 8, 2017, the content of which is incorporated herein by reference.

BACKGROUND OF THE INVENTION

Technical Field

The present invention relates to a method for arranging stud pins in a pneumatic tire.

Related Art

A stud tire is available as one type of pneumatic tire. The stud tire is a tire suitable mainly for an ice and snow road surface, and is formed by arranging a plurality of pin holes in a tread portion and driving stud pins into the pin holes. Since the stud pins embedded in the tread portion can scratch an ice and snow road surface, the ice and snow road performances such as braking properties and driving properties are superior to general pneumatic tires.

For example, such a stud tire is disclosed in WO 2017/22683 A1. In WO 2017/22683 A1, the vibration sound of the tire can be reduced, while the ice performance of the tire is maintained, by specifying an interval between a plurality of stud pins arranged along a tire circumferential direction in the tread portion to a specific range.

SUMMARY

However, with regard to the above stud tire, consideration has been made mainly on the interval in the tire circumferential direction, and no particular study has been made on a tire width direction. Therefore, there is room for improving the ice and snow road performance by carrying out detailed studies especially on the arrangement in the tire width direction.

An object of the present invention is to improve the ice and snow road performance of a stud tire.

The present invention provides a method for arranging stud pins in a tread portion at intervals in a tire width direction so as to form a plurality of rows, the method including specifying an inner region, an intermediate region, and an outer region by virtually partitioning the tread portion into equal three parts from a center line extending in a tire circumferential direction to a ground contact end in the tire width direction outward; and arranging the stud pins such that among average numbers of stud pins per row in the inner region, the intermediate region and the outer region, the number in the outer region is the largest, the number in the intermediate region is the second largest, and the number in the inner region is the smallest.

According to this method, since the arrangement ratio of the stud pins is larger in a region closer to the outer side in the tire width direction in the tread portion, it is possible to scratch the road surface strongly in the outer region in the tire width direction where the ground contact pressure is high. Therefore, it is possible to improve the ice and snow road performance.

The number of the stud pins in an outermost row in the tire width direction may be maximized.

According to this method, since the number of the stud pins in the outermost row in the tire width direction having the highest ground contact pressure among a plurality of rows is maximized, it is possible to efficiently improve the ice and snow road performance.

The stud pins may be arranged in a plurality of rows extending in the tire circumferential direction at equal intervals in the tire width direction, and each of the equal intervals has a distance of 4.5 mm to 9 mm.

According to this method, it is possible to improve the ice and snow performance by specifying each of the intervals between the stud pins in the tire width direction to an appropriate range. When each of the intervals between the stud pins is narrower than the above range, each stud pin crushes the ice and snow road more than necessary, and the scratching force on the ice and snow road is weakened. Also, when each of the intervals between the stud pins is wider than the above range, the number of the stud pins decreases, so that the scratching force on the ice and snow road is weakened.

When the tread portion has a ground contact width of 140 mm to 260 mm, the number of rows of the stud pins may be 28 rows.

According to this method, each of the intervals between the stud pins falls within the above corrected range by arranging 28 rows of the stud pins on a tire having a ground contact width of 140 mm to 260 mm. That is, the number of rows of the stud pins is optimized for a tire having a ground contact width of 140 mm to 260 mm. As a result, it is possible to maximize the ice and snow road performance of the tire having the above dimensions.

According to the present invention, since the arrangement ratio of the stud pins is larger in a region closer to the outer side in the tire width direction in the tread portion, it is possible to scratch the road surface strongly in the outer region in the tire width direction where the ground contact pressure is high. Therefore, it is possible to improve the ice and snow road performance.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

An embodiment of the present invention will be described below with reference to the accompanying drawings.

Figure 1:
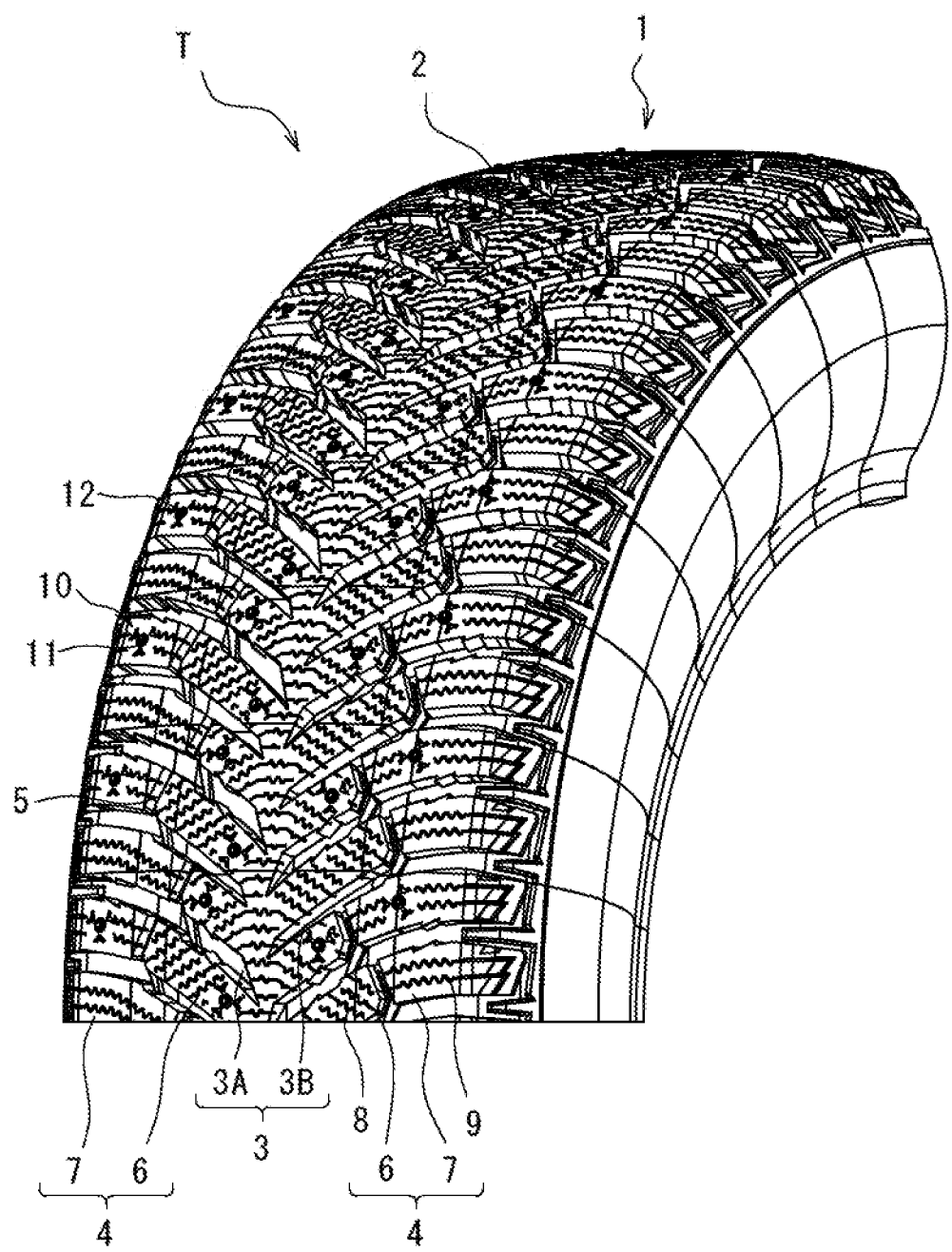
FIG. 1 is a perspective view of a stud tire.
Figure 2:
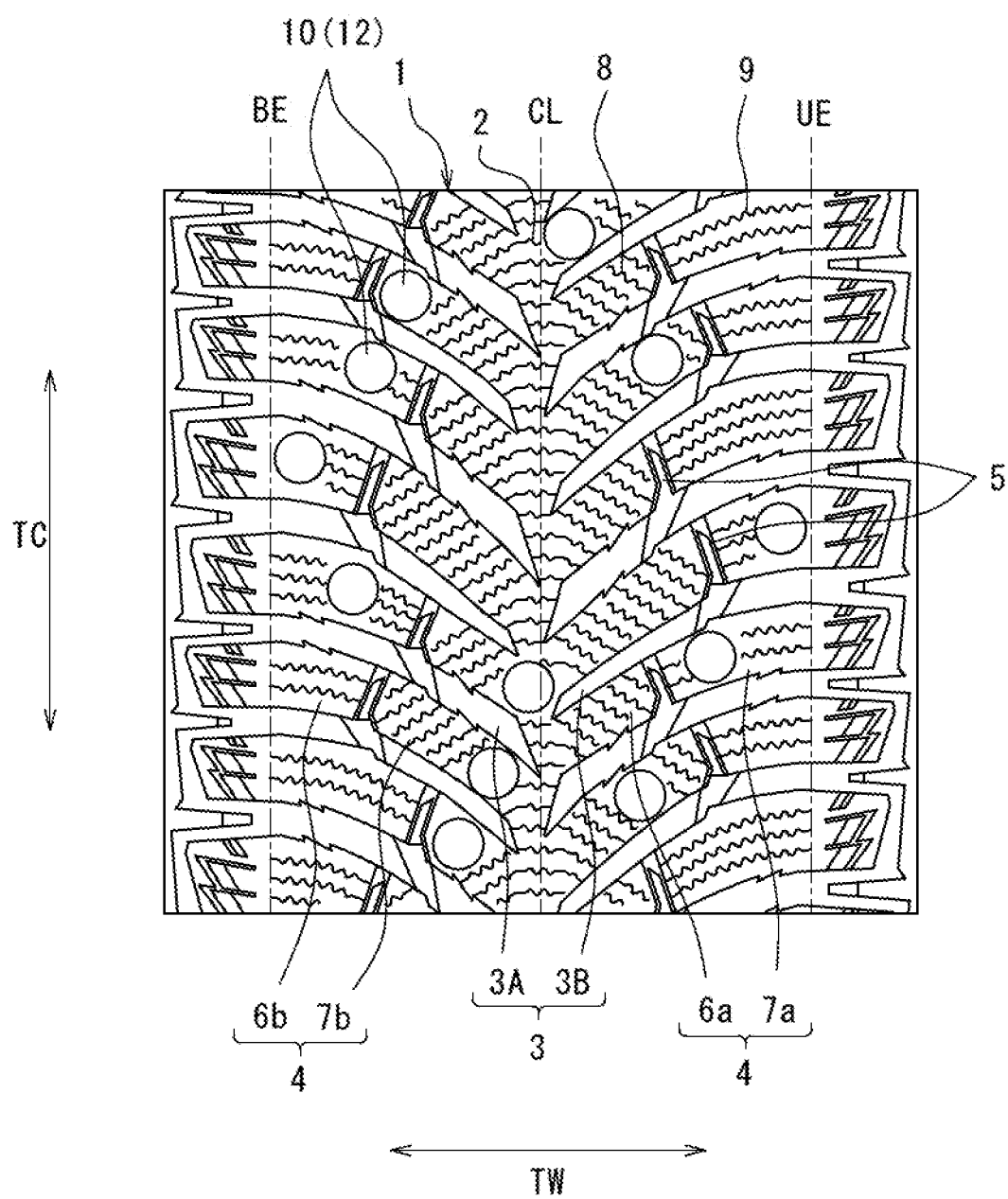
FIG. 2 is a partial development view showing a tread portion.

FIGS. 1 and 2 are respectively a perspective view and a development view of a stud tire T to which a method according to an embodiment of the present invention is applied. A method for arranging stud pins 12 in a pneumatic tire (stud tire T) will be described as the present embodiment. The stud tire T is constituted by inserting a plurality of stud pins 12 into a tread portion 1 of a rubber pneumatic tire.

Referring to FIG. 1, reference symbol TC denotes a tire circumferential direction; and TW, a tire width direction. In addition, reference symbol CL denotes the center line (equator line) of the tread portion 1 in the tire width direction. Further, reference symbols UE and BE respectively denote the ground contact ends of both ends of the tread portion 1 in the tire width direction.

A center rib 2 is formed on the center line CL of the tread portion 1. On both sides of the center rib 2 in the tire width TW direction, inclined blocks 4 defined by inclined grooves 3 extend. As a result, the inclined blocks 4 are arranged at predetermined intervals in the tire circumferential direction TC.

The inclined groove 3 includes a wide first inclined groove 3A and a narrow second inclined groove 3B. Portions of both side edges of the first inclined groove 3A are formed in a zigzag shape.

A longitudinal groove 5 is formed midway in the inclined block 4, the longitudinal groove 5 being substantially orthogonal communication with the first inclined groove 3A and the second inclined groove 3B on both sides. The longitudinal grooves 5 are alternately displaced between the inclined blocks 4 arranged in the tire circumferential direction TC on the center side and the lateral sides in the tire width direction TW. As a result, the inclined block 4 is separated into a center block 6 and a shoulder block 7. The center block 6 is composed of a short first center block 6a and a long second center block 6b. The shoulder block 7 is composed of a long first shoulder block 7a following the first center block 6a and a short second shoulder block 7b following the second center block 6b.

In the center rib 2 and the center block 6 following the center rib 2, first sipes 8 are formed radially around the center rib 2 side. Two or three second sipes 9 are formed in the shoulder block 7 along the longitudinal direction of the shoulder block. The sipes 8 and 9 each have a waveform. One end of the first sipe 8 communicates with the inclined groove 3, and the other end of the first sipe 8 terminates in the center rib 2 or the center block 6. One end of the second sipe 9 communicates with the longitudinal groove 5, and the other end of the second sipe 9 terminates in the shoulder block 7. However, a pin region 10 is formed in each of the blocks 6 and 7 as described later, and the sipes 8 and 9 are not formed in this pin region 10.

The pin regions 10 are formed in the center rib 2, the center blocks 6 and the shoulder blocks 7. Pin holes 11 (see FIG. 1) for insertion of the stud pins 12 are provided in the pin regions 10, and the pin regions 10 are provided in a predetermined arrangement as described later. In the method according to the present embodiment, one stud pin 12 is arranged for one pin region 10.

Figure 3:
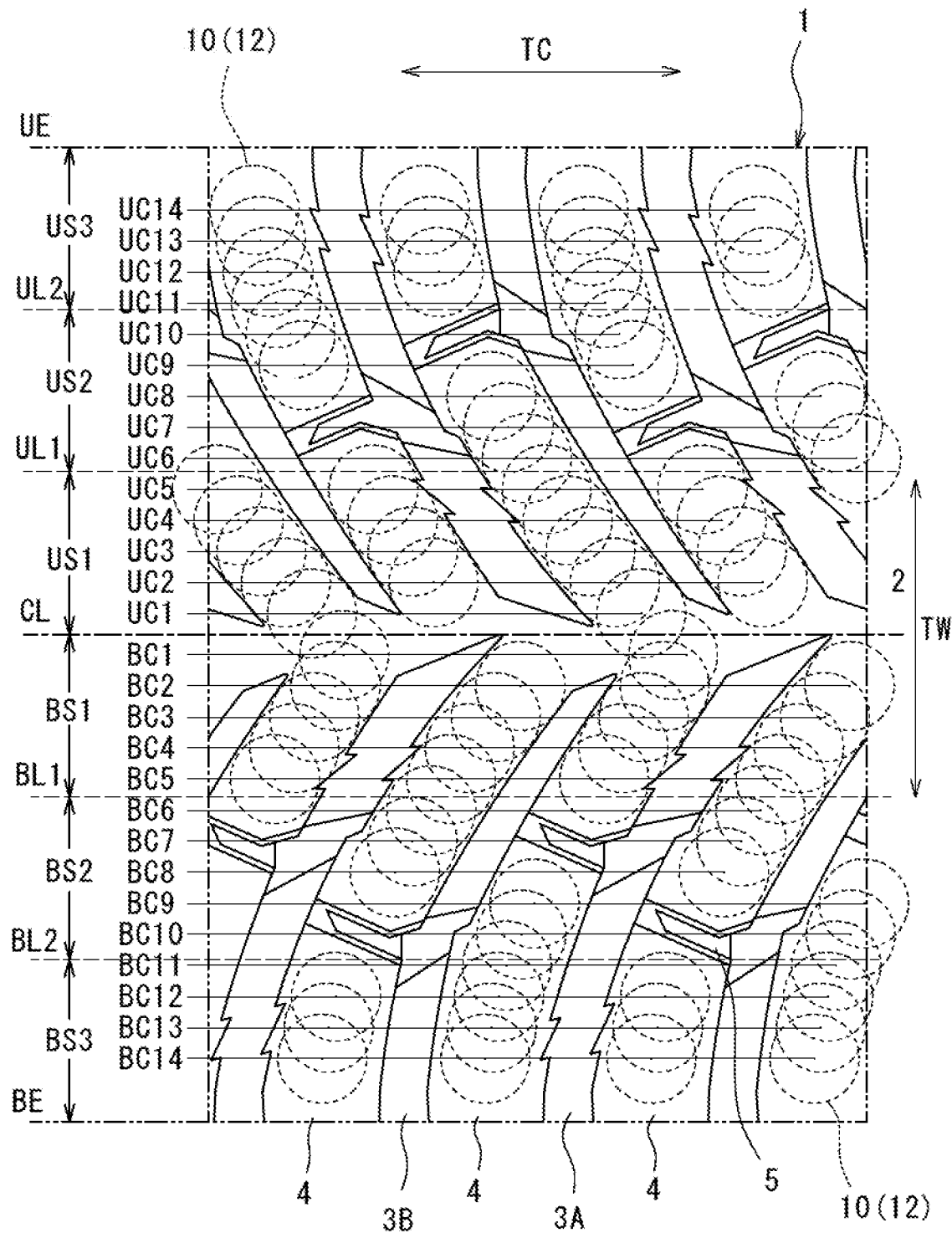
FIG. 3 is a development view showing a stud pin arrangement.

FIG. 3 is a development view showing the arrangement of the pin regions 10, that is, the arrangement of the stud pins 12. FIG. 3 shows regions from the center line CL to the ground contact ends UE and BE. In the present embodiment, a distance from the center line CL to each of the ground contact ends UE and BE in the tire width direction TW is, for example, 160 mm. In the region defined by this distance, the stud pins 12 are arranged in 28 rows at equal intervals in the tire width direction TW. Specifically, 14 rows are arranged on each of both outer sides from the center line CL in the tire width direction TW, and the interval between the rows of the stud pins 12 is about 5.2 mm. In particular, in the stud tire T, it is preferable that the interval between the rows is 4.5 mm to 9 mm.

Referring to FIG. 3, a portion above the center line CL is referred to as an upper mold, and a portion below the center line CL is referred to as a lower mold. Rows UC1 to UC14 are arranged on the upper mold and rows BC1 to BC14 are arranged on the lower mold. FIG. 3 shows the positions of the stud pins 12 that can be arranged in this tread pattern. FIG. 3 shows that the stud pins 12 are arranged at almost correct intervals in the tire width direction TW but are not actually arranged at the shown intervals in the tire circumferential direction TC. That is, referring to FIG. 3, the stud pins 12 arranged on the entire circumference of the tire are virtually collected in the shown range by moving the stud pints 12 in the tire circumferential direction TC without changing the positions in the tire width direction TW.

In order to evaluate the arrangement ratio of the stud pins 12 in the tire width direction TW, the region from the center line CL to the ground contact end UE is divided into three equal parts by imaginary lines UL1 and UL2 to specify an inner region US1, an intermediate region US2, and an outer region US3. Similarly, the region from the center line CL to the ground contact end BE is divided into three equal parts by imaginary lines BL1 and BL2 to specify an inner region BS1, an intermediate region BS2, and an outer region BS3. Among the rows UC1 to UC14 and BC1 to BC14, the rows UC1 to UC5 and BC1 to BC5 are located in the inner regions US1 and BS1, the rows UC6 to UC10 and BC6 to BC10 are located in the intermediate regions US2 and BS2, and the rows UC11 to UC14 and BC11 to BC14 are located in the outer regions US3 and BS3.

Figure 4:
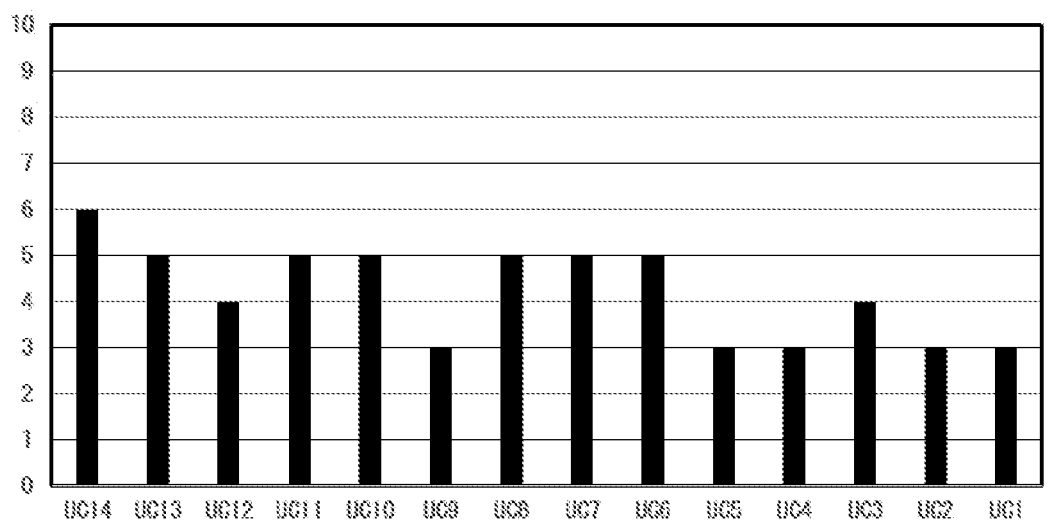
FIG. 4 is a graph showing the number of stud pins in each row on an upper mold.
Figure 5:
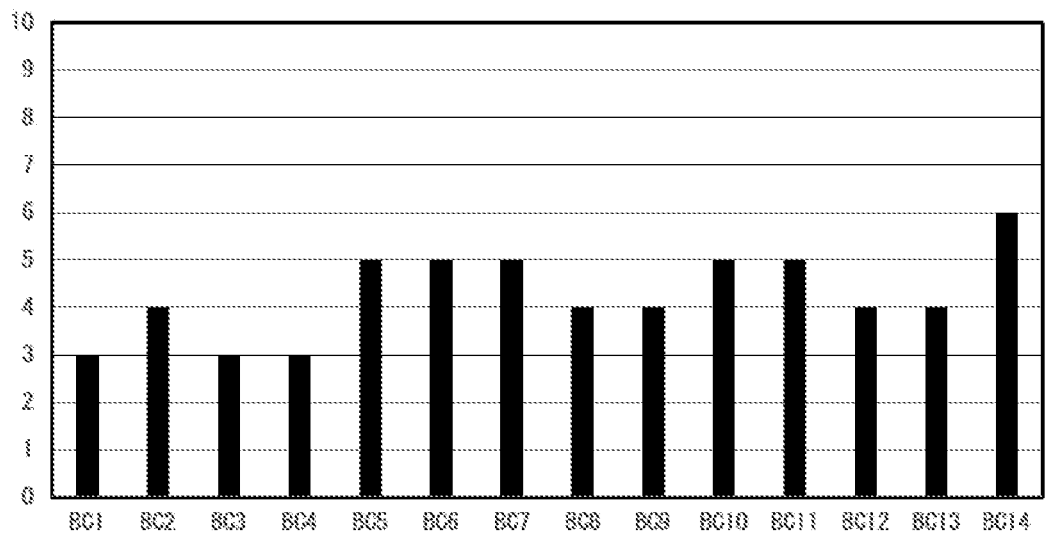
FIG. 5 is a graph showing the number of stud pins in each row on a lower mold.

FIGS. 4 and 5 are graphs showing the number of the pin regions 10 in the respective rows UC1 to UC14 and BC1 to BC14 in the upper mold and the lower mold. The abscissa of each graph represents the respective rows UC1 to UC14 and BC1 to BC14, and the ordinate of each graph represents the numbers of the stud pins 12. For example, in the upper mold (FIG. 4), the number of the stud pins 12 in the third row UC3 is four.

Referring to the graph of the upper mold shown in FIG. 4, the total number of the stud pins 12 arranged on the first row UC1 to the fifth row UC5 in the inner region US1 is 16, and the average number of the stud pins 12 per row is 3.2. The total number of the stud pins 12 arranged on the sixth row UC6 to the 10th row UC10 in the intermediate region US2 is 23, and the average number of the stud pins 12 per row is 4.6. The total number of the stud pins 12 arranged on the 11th row UC11 to the 14th row UC14 in the outer region US3 is 20, and the average number of the stud pins 12 per row is 5.

Referring to the graph of the lower mold shown in FIG. 5, the total number of the stud pins 12 arranged on the first row BC1 to the fifth row BC5 in the inner region BS1 is 18, and the average number of the stud pins 12 per row is 3.6. The total number of the stud pins 12 arranged on the sixth row BC6 to the 10th row BC10 in the intermediate region BS2 is 23, and the average number of the stud pins 12 per row is 4.6. The total number of the stud pins 12 arranged on the 11th row BC11 to the 14th row BC14 in the outer region BS3 is 19, and the average number of the stud pins 12 per row is 4.75.

As shown in FIGS. 4 and 5, the stud pins 12 are arranged such that among numbers of stud pins 12 per row in the inner region US1 and BS1, the intermediate region US2 and BS2, and the outer region US3 and BS3, the number in the outer regions US3 and BS3 is the largest, the number in the intermediate regions US2 and BS2 is the second largest, and the number in the inner region US1 and BS1 is the smallest.

Referring to the 14th rows UC14 and BC14 which are the outermost rows, the number of the stud pins 12 is six in both the upper mold and the lower mold, and is larger than the number of the stud pins 12 in each of the other rows which correspond to the first to 13th rows UC1 to UC13 and the first to 13th rows BC1 to BC13.

The method according to the present embodiment has the following advantages.

(1) The arrangement ratio of the stud pins 12 (the number of the stud pins 12 per row) is larger in a region closer to the outer side in the tire width direction TW in the tread portion 1, so that it is possible to scratch the road surface strongly in the outer region in the tire width direction TW where the ground contact pressure is high. Therefore, it is possible to improve the ice and snow road performance.

(2) Among the plurality of rows UC1 to UC14 and BC1 to BC14, the numbers of the stud pins 12 in the outermost rows UC14 and BC14 in the tire width direction TW, which have the highest ground contact pressure, are maximized, so that it is possible to efficiently improve the ice and snow performance.

(3) It is possible to improve the ice and snow road performance by specifying each of the intervals between the stud pins 12 in the tire width direction TW to an appropriate range (4.5 mm to 9 mm). When each of the intervals between the stud pins 12 is narrower than the above range, each stud pin 12 crushes the ice and snow road more than necessary, and the scratching force on the ice and snow road is weakened. Also, when each of the intervals between the stud pins 12 is wider than the above range, the number of the stud pins 12 decreases, so that the scratching force on the ice and snow road is weakened.

(4) Each of the intervals between the stud pins 12 falls within the above corrected range by arranging 28 rows of the stud pins 12 on a tire having a ground contact width of 140 mm to 260 mm. That is, the number of rows of the stud pins 12 is optimized for a tire having a ground contact width of 140 mm to 260 mm. As a result, it is possible to maximize the ice and snow road performance of the tire having the above dimensions.

Although the specific embodiment of the present invention has been described above, the present invention is not limited to the above-described embodiment, and various modifications can be made within the scope of the present invention.

For example, the number of rows of the stud pins 12 may be other than 28 rows. Specifically, the number of rows of the stud pins 12 may be set such that each of the intervals between the stud pins 12 falls within an appropriate range (4.5 mm to 9 mm) in accordance with the ground contact width of the stud tire.

What is claimed is:

1. A method for arranging stud pins in a tread portion at intervals in a tire width direction so as to form a plurality of rows, the method comprising:
    specifying an inner region, an intermediate region, and an outer region by virtually partitioning the tread portion into equal three parts from a center line extending in a tire circumferential direction to a ground contact end in the tire width direction outward, the equal three parts each having plural stud-pin rows extending in the tire circumferential direction; and
    arranging the stud pins such that among average numbers of stud pins per stud-pin row in the inner region, the intermediate region and the outer region, the number in the outer region is the largest, the number in the intermediate region is the second largest, and the number in the inner region is the smallest.

2. The method according to claim 1, wherein the number of the stud pins in an outermost stud-pin row in the tire width direction is maximized.

3. The method according to claim 1, wherein
    the stud pins are arranged in the plural stud-pin rows at equal intervals in the tire width direction, and
    each of the equal intervals has a distance of 4.5 mm to 9 mm.

4. The method according to claim 1, wherein when the tread portion has a ground contact width of 140 mm to 260 mm, the number of stud-pin rows of the stud pins is 28.

5. The method according to claim 2, wherein
    the stud pins are arranged in the plural stud-pin rows at equal intervals in the tire width direction at equal intervals in the tire width direction, and
    each of the equal intervals has a distance of 4.5 mm to 9 mm.

6. The method according to claim 2, wherein when the tread portion has a ground contact width of 140 mm to 260 mm, the number of stud-pin rows of the stud pins is 28.

7. The method according to claim 3, wherein when the tread portion has a ground contact width of 140 mm to 260 mm, the number of stud-pin rows of the stud pins is 28.

8. The method according to claim 5, wherein when the tread portion has a ground contact width of 140 mm to 260 mm, the number of stud-pin rows of the stud pins is 28.

9. The method according to claim 1, wherein the arranging the stud pins is performed with reference to a graph of an upper mold and a graph of lower mold, the graphs each showing a number of the stud pins for each of the stud-pin rows in the equal three parts.

* * * * *